United States Patent [19]

Sugaya et al.

[11] 3,912,483

[45] Oct. 14, 1975

[54] METHOD OF MAKING A MAGNETIC HEAD

[75] Inventors: Hiroshi Sugaya, Suita; Takeshi Ishihara, Neyagawa; Kisuke Sawai, Kadoma, all of Japan

[73] Assignee: Matsushita Electric Industrial Co., Ltd., Osaka, Japan

[22] Filed: Jan. 15, 1974

[21] Appl. No.: 433,480

Related U.S. Application Data

[63] Continuation of Ser. No. 225,511, Feb. 11, 1972, abandoned.

[30] Foreign Application Priority Data

Sept. 25, 1968 Japan ................................ 43-70656

Oct. 22, 1968 Japan ................................ 43-77727

[52] U.S. Cl. .............................. 65/43; 65/58; 65/59

[51] Int. Cl.$^2$ ........................................ C03C 27/00

[58] Field of Search ............... 65/43, 58, 59; 29/603

[56] References Cited

UNITED STATES PATENTS

| | | | |
|---|---|---|---|
| 3,258,542 | 6/1966 | Pfost | 29/603 X |
| 3,529,349 | 9/1970 | Schoot et al. | 29/603 |
| 3,578,920 | 5/1971 | Okamoto et al. | 29/603 |

FOREIGN PATENTS OR APPLICATIONS

| | | | |
|---|---|---|---|
| 996,957 | 6/1965 | United Kingdom | 29/603 |

*Primary Examiner*—Arthur D. Kellogg

*Attorney, Agent, or Firm*—Stevens, Davis, Miller & Mosher

[57] ABSTRACT

A method of making a magnetic head which comprises the steps of attaching, by evaporation, sputtering or other means, glass of a predetermined composition to the gap-defining face of at least one of two core members in such a manner that there are formed on said gap-defining face layers having thicknesses corresponding to the percentages by volume of said predetermined glass components, joining said two core members together, thereafter subjecting the joined core members to a heat treatment at a temperature near the melting point of said glass to thereby vitrify said components and filling the gap between said two gap-defining faces with glass of a predetermined composition to thereby form a head gap.

15 Claims, 9 Drawing Figures

Figure 1A:
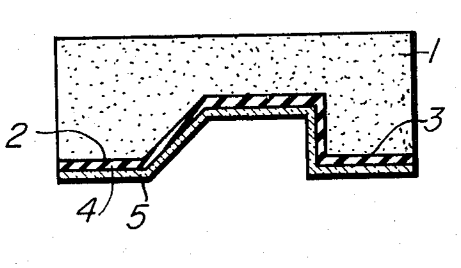

H. SUGAYA,
T. ISHIHARA
& E. SAWAI

INVENTORS

BY Stevens, Davis, Miller & Mosher

ATTORNEYS

INVENTOR

BY

ATTORNEY

METHOD OF MAKING A MAGNETIC HEAD

This is a continuation, of application Ser. No. 225,511, filed Feb. 11, 1972, now abandoned.

This invention relates to a method of making a magnetic head.

For the manufacture of a magnetic head having a core formed of permalloy, there has heretofore been a method in which a thin film of beryllium steel or like material having a thickness equal to a predetermined gap length is held by and between two core members. However, if ferrite is used as the material for the core in this method, no secure junction may be established between the thin film and the ferrite core and accordingly the thin film tends to come off the core as is often the case with ferrite material. This leads to a very short life of the magnetic head.

Another method has been proposed in which a non-magnetic material such as SiO is evaporated to form a layer of predetermined thickness on the gap-defining faces of the magnetic head core members and the layer thus formed is used as the gap. In this case, however, if the core is formed of ferrite, the gap provided by the layer of such material is not sufficient in strength and this also often results in the destruction of the gap when the magnetic head is operated.

In order to eliminate these drawbacks, it has been proposed to hold a film of glass having a somewhat greater thickness than a predetermined gap length between the gap-defining faces of two core members, to heat the glass to its softening point, compress it to a limit gauge having a predetermined thickness and cool it to form a gap. This method is effective in making a magnetic head having a gap length of several microns. However, according to this prior art method, it is difficult to make or dispose a very thin gap limit gauge when it is desired to form a gap having a length of 1 $\mu$ or less as in the magnetic head for video tape recorders, and it is also difficult to form a glass film having such a small thickness. Otherwise, the melting glassy material has to be squeezed out against the capillary action, and this is almost impossible. Thus, it has in practice been necessary to employ a glass film having a thickness several times as great as a predetermined gap length, where has this causes the core members in use to be deviated from each other when they are compressed, which in turn leads to insufficient accuracy of the gap formed. Aslo, the glass material itself is heated only to its softening point which does not ensure a sufficient junction between the ferrite of the core members and the glass film.

In view of the fact described just above, a further method has been proposed in which a spacer having a predetermined thickness is interposed between the two core members so as to form a clearance therebetween and the clearance is filled with molten glass due to capillarity. This method ensures a sufficiently rigid junction between the glass and the core members, and accordingly rigid construction of the resultant magnetic head. However, if the gap length desired is 1 $\mu$ or near, there is a limitation to the depth of the gap into which the molten glass penetrates due to cappillarity. Moreover, the rate of penetration varies with the type of the glass material in use, and especially, the back gap portion fails to be filled with glass. Furthermore, the types of glass material available for this method are very much limited, because the hardness of the glass material should be strong enough as compared with the head core material.

It is therefore an object of the present invention to eliminate these drawbacks inherent to the prior art and provide a method of making a magnetic head with ease and reliability even if the gap in the head is of a very much limited length.

It is another object of the present invention to provide a method of making a magnetic head having a required gap length without using a thin glass film whose thickness is substantially equal to the required gap length.

It is still another object of the present invention to provide a method of making a good magnetic head irrespective of the gap length or gap depth of the magnetic head.

Figure 1B:
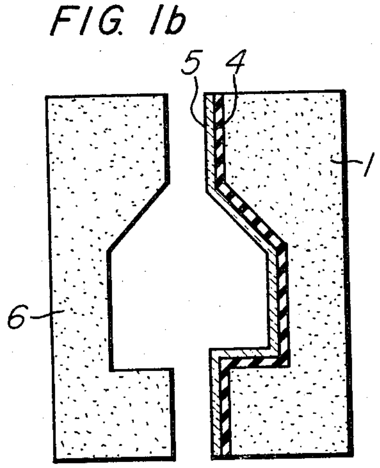
Figure 2A:
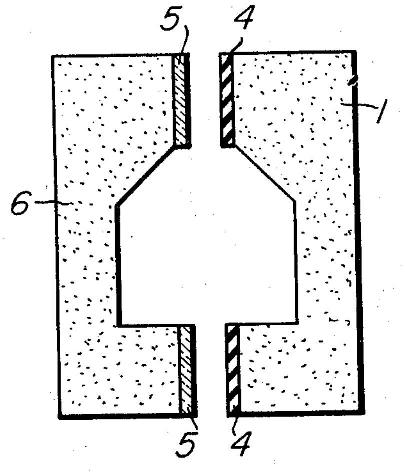
Figure 2B:
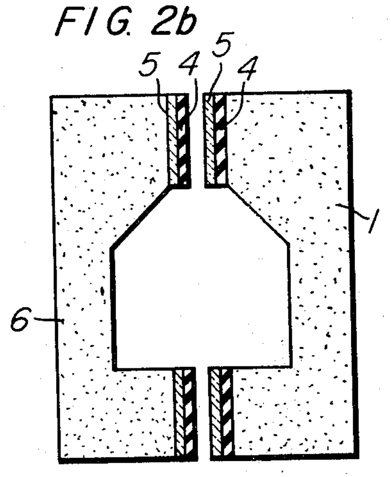
Figures 3, 4A, 4B:
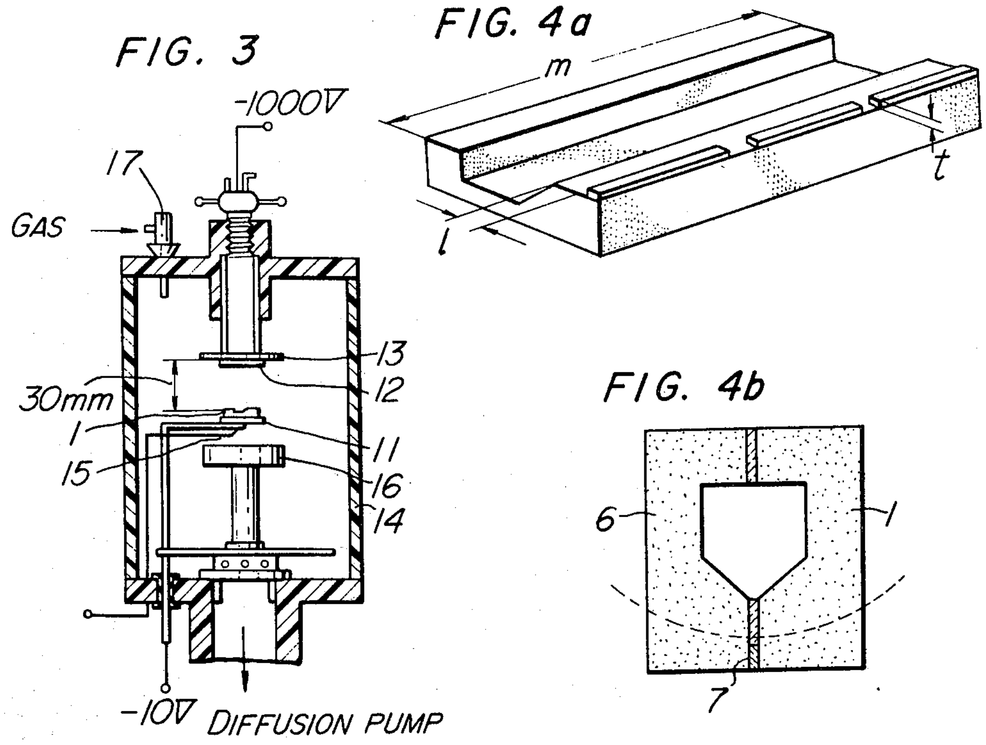
Figure 5A:
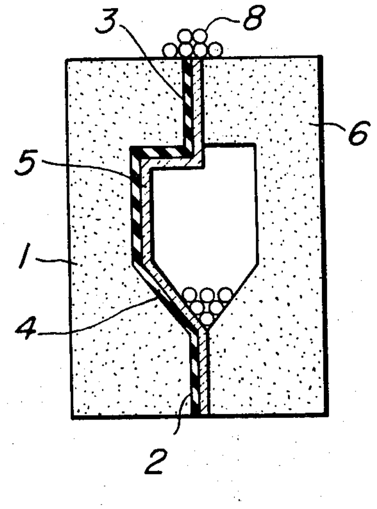
Figure 5B:
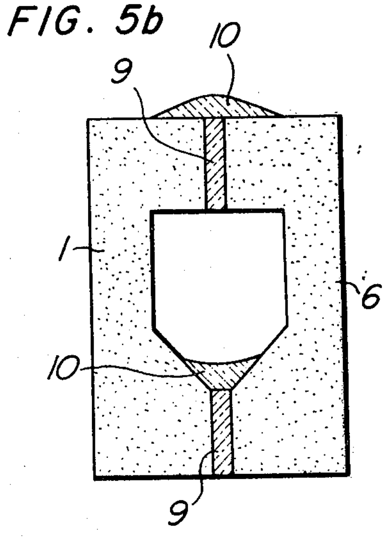

These and another objects and features of the present invention will become fully apparent from the following description taken in conjunction with the accompanying drawings, in which:

FIGS. 1*a* and 1*b* are plan views of the magnetic head core for illustrating an example of the method according to the present invention;

FIGS. 2*a* and 2*b* are similar views of the magnetic head core for illustrating another example of the method according to the present invention;

FIG. 3 is a cross-sectional side view showing an example of the sputtering system used with the present invention;

FIGS. 4*a* and 4*b* are a perspective view and a plan view respectively, showing still another example of the present invention;

FIGS. 5*a* and 5*b* are plan views showing yet still another example of the present invention.

Description will be made of the case where a magnetic head core is formed of a pair of flattened U-shaped core members disposed in opposed relationship with each other, because such U-shaped core members are most usually used to produce a magnetic head.

Referring to FIG. 1*a*, a core member 1 having a substantially flattened U-shaped cross-section is prepared so that its front gap-defining face 2 and back gap-defining face 3 provide mirror-like smooth surfaces and are flush with each other. A layer 4 of silicon oxide is applied onto each of these front and back gap-defining faces 2 and 3 by evaporation or by the vapor phase growth method such as sputtering or the like. If evaporation is employed, the material SiO contained in a crucible is heated for evaporation in a vacuum at a predetermined temperature for a predetermined time so that a layer of SiO having a predetermined thickness is formed on the front and back gap-defining faces of the core member 1.

If a slight quantity of oxygen is previously contained in the vacuum, SiO will be changed into $SiO_2$ before it is evaporated to stick to the front and back gap-defining faces 2 and 3, and there will thus be formed a layer of $SiO_2$ on the core member 1.

It has been found that a temperature of about 1,200°C and a pressure in the order of $10^{-5}$ Torr are preferable for the crucible so that satisfactory results may be obtained.

In case sputtering is adopted, use may be made of a sputtering system as shown in FIG. 3. A magnetic head (ferrite) core 1 is mounted on an aluminum substrate holder 11 to which a voltage of $-10$ V may be applied. Spaced apart from the surface of the core 1, as far as 30 mm, on which surface to effect an evaporation, a silicon target 12 is placed being carried by a quartz plate 13 (cathode) to which a voltage of −1,000 V may be applied. The silicon target 12 may have a diameter of 40 mm. The section including the quartz plate 13 need be insulated from the chamber 14 evacuated to 0.1 – 0.2 Torr. and at the same time water-cooled as the case demands. As the substrate holder 11 may be too much heated due to the sputtering, a thermocouple 15 is provided to monitor the temperature of the holder 11. An anode 16 is situated below the substrate holder 11 so that the sputtering is caused from the Si target 12 to the anode 16. A gas inlet valve 17 may be used when a gas is required for the evaporation. By this system, there will be formed a layer of $SiO_2$ on the core member 1 at a rate of 0.2 μ per hour. Thus, the rate of sputtering may be freely adjusted with respect to time.

The head core thus provided with a layer of $SiO_2$ may be used to make a magnetic head, whereas such a head core is not sufficient for the strength of the junction between $SiO_2$ and ferrite and it is desirable that the head core be again subjected to a heat treatment so that $SiO_2$ may be securely fused to the ferrite of the head core.

However, this method is not practical because silicon oxide $SiO_2$ (or SiO) usually melts at about 1400°C and at this temperature ferrite is further baked to change its magnetic characteristic. This also leads to a great limitation to the variety of the jig material available for use.

In order to lower the melting point of silicon oxide, the present invention provides an additional layer such as a layer 5 of PbO applied onto the layer 4 of silicon oxide $SiO_2$ (or SiO), as shown in FIG. **1*b***, such as by evaporation or sputtering. In this case it is desirable that SiO be previously made into $SiO_2$ by being subjected to a heat treatment within an oxygen gas environment.

Thereafter, the core member 1 is subjected to a heat treatment at a temperature in the range of 500° to 800°C which corresponds to the melting point of lead glass, and thereby reaction takes place between $SiO_2$ and PbO to produce lead glass which fills the gap portion remaining between the layer of $SiO_2$ and the ferrite core member 1. The lead glass filling the gap portion is further melted so that it is chemically combined to the ferrite surface, and thus there is formed a very strong gap.

Actually, where use is made of lead glass composed of 40 % $SiO_2$ and 60 % PbO, both by weight, in order to form a gap having a length of 1 μ, $SiO_2$ is applied to form a layer of 0.73 μ thickness and PbO is applied to form a layer of 0.27 μ thickness. The ferrite core member 1 having these two layers thus formed thereon is disposed in opposed relationship with another ferrite core member 6 having no such layer formed yet thereon, and then these two core members are subjected to a heat treatment at a temperature of 500° to 600°C, whereby the two layers are formed into a body of completely molten lead glass and thus there may be formed a glass gap having a thickness of 1 μ.

The layer of PbO may be formed on the ferrite core member 1 simply by substituting lead for silicon in the aforementioned sputtering system or by heating PbO contained in a crucible by means of a heater for evaporation in a vacuum.

It is also possible to cause lead to evaporate in a low vacuum containing some oxygen so that Pb is oxidized while it is evaporated and sticks to the ferrite core member 1 in the form of PbO.

Another alternative is to evaporate lead in its metal phase into a layer of 0.21 μ thickness on the layer of $SiO_2$, then heat the layer of lead to about 300°C in an oxydizing atmosphere to thereby form a layer of PbO having a thickness of 0.27 μ, and further heat the same to the range of 500° to 600°C so as to form the two layers of $SiO_2$ and PbO having a total thickness of 1 μ into a body of molten lead glass.

Alternatively, if it is desired to fill the gap with glass composed of 20 % $SiO_2$, 20 % ZnO and 60 % PbO (all by weight) to thereby form a gap length of 1 μ, then $SiO_2$, ZnO and PbO are applied to form layers of the respective components having thicknesses of 0.47 μ, 0.19 μ and 0.34 μ respectively, and these layers are subjected to a heat treatment at a temperature in the vicinity of 600°C, and thereby the desired gap may be formed of the said glass.

Description will now be made of the process in which the layer of $SiO_2$ is chemically formed on the head core member through gas reaction.

The gas in use may be a gas containing a silicon compound, for example, $SiH_4$ or $SiCl_4$, the latter being vaporized by means of argon gas or by means of nitrogen gas. $O_2$ gas or steam ($H_2O$) is mixed with, for example, silane gas and the mixture is introduced into a furnance heated to about 200° to about 500°C so that the gas containing Si is thermally cracked to produce $SiO_2$.

If the ferrite core member is placed into the furnace, the $SiO_2$ produced will stick to the surface of the ferrite core member.

According to an example of the present invention, 100 cc/min. of Ar gas containing 1,000 ppm of $SiH_4$ is mixed with 20 cc/min. of $O_2$ and 11 cc/min. of $N_2$ and the mixture is heated to 350°C. In the heated mixture is disposed the ferrite core member, whereby there is formed a layer of $SiO_2$ on the core member at a rate of 200 A/min. Instead of heating the mixture, it is also possible to use a high-frequency electric field to produce $SiO_2$.

In the examples described above, the layers of $SiO_2$, PbO and ZnO are formed only on one of two core members. However, as shown in FIG. **2*a*, the layer 4 of SiO and the layer 5 of PbO may be provided on different core members 1 and 6 respectively. Alternatively, as shown in FIG. 2*b***, the layers of $SiO_2$ and PbO having thicknesses of 0.56 μ and 0.14 μ respectively may be provided together on each of two core members. In this latter case, the layer of PbO may underlie the layer of $SiO_2$.

Of course, it is also possible to provide these layers only on the front and back gap-defining faces of both core members or, if required, only on the front gap-defining face of each core member, by the use of masking. This will be effective when a coil is wound directly on the core, for some deposit materials have relatively low resistances which would cause short-circuiting between turns of coil if insulation of coils broken.

While description has hitherto been made of the case where use is made of lead glass composed of $SiO_2$ and PbO or glass composed of $SiO_2$, ZnO and PbO, use may also be made of other glass materials such as phosphorus-silicate glass composed of $GeO_2$ and PbO or borosilicate glass composed of $SiO_2$ and $B_2O_2$.

Referring to FIG. **4*a***, there is shown still another example of the present invention. According to this example, a core member is shown which has a length *m* which is several times to more than ten times as great as the track width of a magnetic tape. The front gap-defining face 2 of this core member has an exposed portion whose width *l* is greater than a predetermined gap length. On the rest of the gap-defining face 2, layers 7 of a material which is relatively hard to react with such glass as Ti or Cr but which can be finely evaporated at a relatively high temperature are formed by evaporation into a thickness t equal to a predetermined gap width $SiO_2$ and PbO, for example, are evaporated onto the said exposed portion of the front gap-defining face 2. This core member is urged into contact with another core member in the manner previously described, as shown in FIG. 4*b*, and heated so that there is formed a gap having a width equal to the thickness *t* of the layers 7. In this case, the layers of $SiO_2$ and PbO need not have a thickness exactly equal to the required gap width. Of course, the portion of the core member onto which $SiO_2$ and PbO are evaporated and the order in which these materials are evaporated are not limited to those described above, as in the previous examples.

After the gap is formed, the core assembly is cut into core units each having a length equal to the track width of a magnetic tape, the length being measured along the gap, and then the layers 7 are removed from each core unit as shown by the dotted line in FIG. 4*b*.

In embodying the present invention, a gap-defining layer such as shown by "7" in FIG. 4*a* is not provided if a required gap length does not exceed 5 $\mu$. It should be recalled that the provision of a gap-defining layer was not successful if the required gap length is 1 $\mu$ or smaller, as mentioned above.

Another example of the present invention is shown in FIG. 5*a*. A pair of core members 1 and 6 having layers 4 and 5 of glass composition provided thereon are disposed in opposed relationship and urged into contact with each other. A glass material 8 having a melting point equal to that of the glass of the layers 4 and 5 is disposed on the core assembly at two portions thereof which are adjacent to the front and back gap-defining faces. The core assembly is subjected to a heat treatment at a temperature of 500° to 800°C so that the layers 4 and 5 of glass composition formed in the gas portion are vitrified and completely molten to thereby form a glass gap 9 as shown in FIG. 5*b*.

The glass material 8 is also molten to form glass layers 10 which bridge the two core members 1 and 6 in the vicinity of their front and back gap-defining faces.

These glass layers 10 are meant to increase the mechanical strength of the magnetic head, and therefore the material used for those layers 10 may be any non-magnetic bonding material having a composition which is suited for the reinforcing purpose, such as glass or enamel. However, if the material used for the layers 10 has a higher melting point than the glass forming the head gap, it must be fused at the same time as the glass composition disposed between the gap-defining faces of the two cores is vitrified. On the other hand, if the material used for the layers 10 has a lower melting point than the gap forming glass, it may be fused concurrently with the gap forming glass or it can be applied after the gap forming layers are vitrified to bond the two core members together.

What is claimed is:

1. A method of making a magnetic head comprising two core members each having a gap-defining face separated by a gap spacer of a glass of predetermined composition composed of at least two component materials, one of said component materials having a melting point higher than the melting point of said glass and at least as high as the temperature at which the magnetic properties of said core member deteriorate and the other component having a lower melting point, said method comprising the steps of:

interposing at least one layer of each of said at least two component materials between the gap-defining faces of said spaced apart core members to thicknesses corresponding to the volume percentage compositions of said component materials in said glass;

joining said core members with said gap-defining faces abutting each other, said at least two layers being placed one upon another between said joined core members; and heating the joined core members at a temperature lower than said melting point of said one of said component materials and higher than the melting point of said glass for a time sufficient to permit said two component materials to form a single layer of said glass in the space between the gap-defining faces of said core members.

2. A method for making a magnetic head according to claim 1, wherein said at least two layers are provided by the vapor phase growth method.

3. A method of making a magnetic head according to claim 2, wherein to provide one of said at least two layers which consists essentially of $SiO_2$, SiO is evaporated in a low pressure atmosphere containing oxygen so as to be changed into $SiO_2$ while it is attached to said gap-defining face of said one core member.

4. A method of making a magnetic head according to claim 2, wherein to provide one of said at least two layers which consists essentially of $SiO_2$, a mixture of $O_2$ gas and a gas containing a silicon compound is thermally cracked to produce $SiO_2$, which is attached to one of the head core members disposed in said gas mixture.

5. A method of making a magnetic head according to claim 1, wherein if the length of the gap formed does not exceed 5 $\mu$, the total thickness of said at least two layers provided on said gap-defining face is equal to a predetermined length of the gap.

6. A method of making a magnetic head according to claim 1, wherein when said two core members have a length measured along said gap sufficiently greater than the track width of a magnetic tape, said core members joined with said gap are cut into complete head units.

7. A method of making a magnetic head according to claim 1, wherein said at least two layers consist essentially of PbO and $SiO_2$, respectively.

8. A method of making a magnetic head according to claim 1, wherein said at least two layers comprise three layers consisting essentially of PbO, $SiO_2$ and ZnO, respectively.

9. A method of making a magnetic head according to claim 1, wherein a first layer is provided on the gap-defining face of one of said core members and a second layer is provided on that of the other core member.

10. The method of making a magnetic head according to claim 1, comprising the further steps of:

depositing a layer of one of said at least two component materials on the gap-defining face of one of said core members to a thickness corresponding to the volume percentage composition of said one component material in said glass; and depositing a layer of the second of said at least two component materials on the gap-defining face of the other of said core members to a thickness corresponding to the volume percentage composition of said second component material in said glass.

11. The method of making a magnetic head according to claim 1, comprising the further steps of:

depositing a layer of one of said at least two component materials on the gap-defining face of one of said core members to a thickness corresponding to the volume percentage composition of said one component material in said glass; and depositing a layer of the second of said at least two component materials on said layer of said one component material to a thickness corresponding to the volume percentage composition of said second component material in said glass.

12. A method of making a magnetic head comprising two core members separated by a gap spacer of a glass of predetermined composition composed of at least two component materials, one of said component materials having a melting point higher than the melting point of said glass and at least as high as the temperature at which the magnetic properties of said core member deteriorate and the other component having a lower melting point, said method comprising the steps of:

depositing at least one layer of each of said at least two component materials on at least one of the gap-defining faces of said spaced apart core members to thicknesses corresponding to the volume percentage compositions of said component materials in said glass;

joining said core members with said gap-defining faces abutting each other, said at least one layers being placed one upon another between said joined core members; and heating the joined core members at a temperature lower than said melting point of said one of said component materials and higher than the melting point of said glass for a time sufficient to permit said two component materials to form a single layer of said glass in the space between the gap-defining faces of said core members.

13. A method of making a magnetic head comprising two core members each having a gap-defining face separated by a gap spacer of a glass of predetermined composition composed of at least two component materials, one of said component materials having a melting point higher than the melting point of said glass and at least as high as the temperature at which the magnetic properties of said core member deteriorate, said method comprising the steps of:

interposing at least one layer of each of said at least two component materials between the gap-defining faces of said core members to thicknesses corresponding to the volume percentage compositions of said component materials in said glass;

joining said core members with said gap-defining faces abutting each other, said at least two layers being placed one upon another between said joined core members;

disposing a vitreous material on the core members at the portions thereof adjacent to the joined gap-defining faces; and heating the joined core members at a temperature lower than said melting point of said one of said component materials and higher than the melting point of said glass to form a single layer of said glass in the space between the gap-defining faces of said core members and to soften the vitreous material to bridge the two core members.

14. A method of making a magnetic head comprising two core members each having a gap-defining face separated by a gap spacer of a glass of predetermined composition composed of at least two component materials, one of said component materials having a melting point higher than the melting point of said glass and at least as high as the temperature at which the magnetic properties of said core member deteriorate, said method comprising the steps of:

interposing at least one layer of each of said at least two component materials between the gap-defining faces of said core members to thicknesses corresponding to the volume percentage compositions of said component materials in said glass;

joining said core members with said gap-defining faces abutting each other, said at least two layers being placed one upon another between said joined core members;

heating the joined core members at a temperature lower than said melting point of said one of said component materials and higher than the melting point of said glass to form a single layer of said glass in the space between the gap-defining faces of said core members; and wherein after a predetermined gap is formed, a vitreous material is disposed adjacent to the top and softened so as to bridge the two core members.

15. A method of making a magnetic head comprising two core members each having a gap-defining face separated by a gap spacer of a glass of predetermined composition composed of at least two component materials, one of said component materials having a melting point higher than the melting point of said glass and at least as high as the temperature at which the magnetic properties of said core member deteriorate, said method comprising the steps of:

attaching a material which is hard to react with glass to the gap-defining face of one of said core members to form a thickness equal to a predetermined gap length to serve as a gap-controlling layer;

interposing at least one layer of each of said at least two component materials between the gap-defining faces of said core members, except on those portions of said gap-defining faces on which said gap-controlling layer has been formed, to thicknesses corresponding to the volume percentage compositions of said component materials in said glass;

joining said core members with said gap-defining faces abutting each other, said at least two layers being placed one upon another between said joined core members;

heating the joined core members at a temperature lower than said melting point of said one of said component materials and higher than the melting point of said glass to form a single layer of said glass in the space between the gap-defining faces of said core members;

cooling said joined core members after said heating step; and thereafter removing said gap-controlling layer.

* * * * *

UNITED STATES PATENT OFFICE

CERTIFICATE OF CORRECTION

PATENT NO. 3,912,483

DATED October 14, 1975

INVENTOR(S) Hiroshi SUGAYA - Takeshi ISHIHARA - Eisuke SAWAI

It is certified that error appears in the above-identified patent and that said Letters Patent are hereby corrected as shown below:

Inventors' names should read as follows:

Hiroshi SUGAYA, Takeshi ISHIHARA, Eisuke SAWAI

Signed and Sealed this

*thirteenth* Day of *January 1976*

[SEAL]

*Attest:*

RUTH C. MASON
*Attesting Officer*

C. MARSHALL DANN
*Commissioner of Patents and Trademarks*